United States Patent Office 2,826,313
Patented Mar. 11, 1958

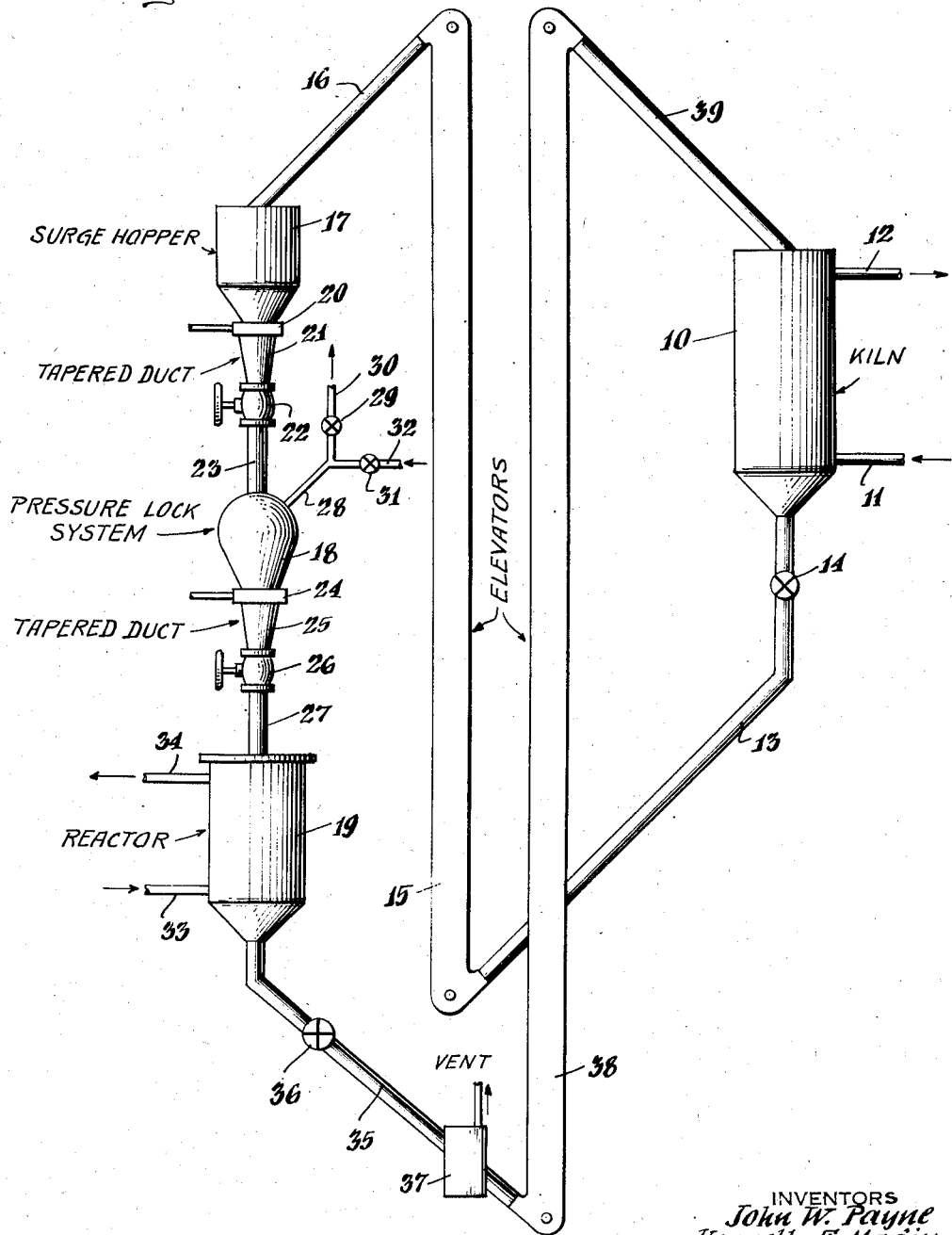

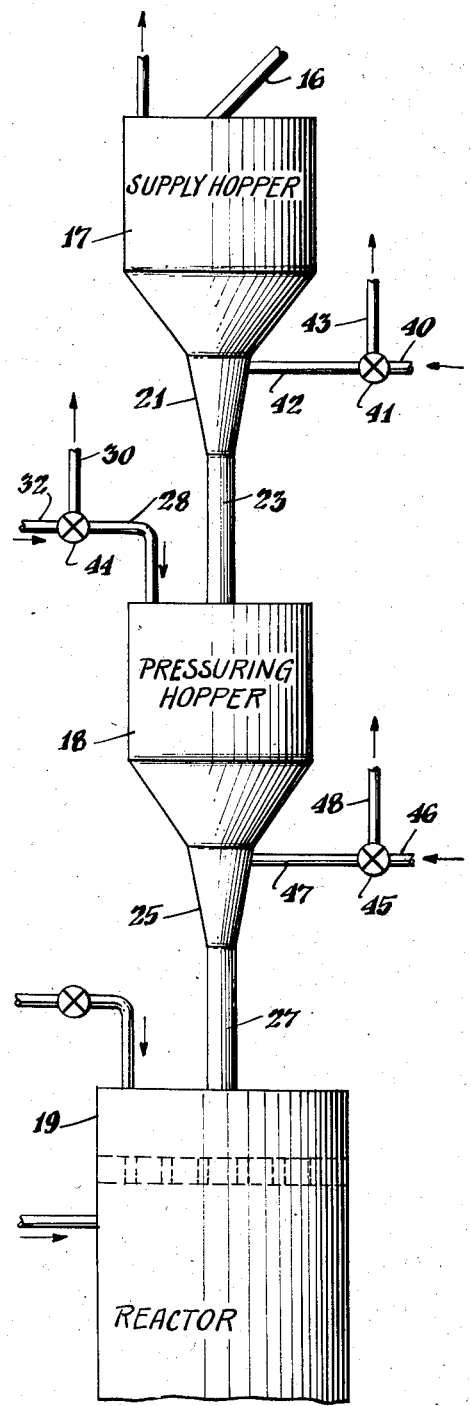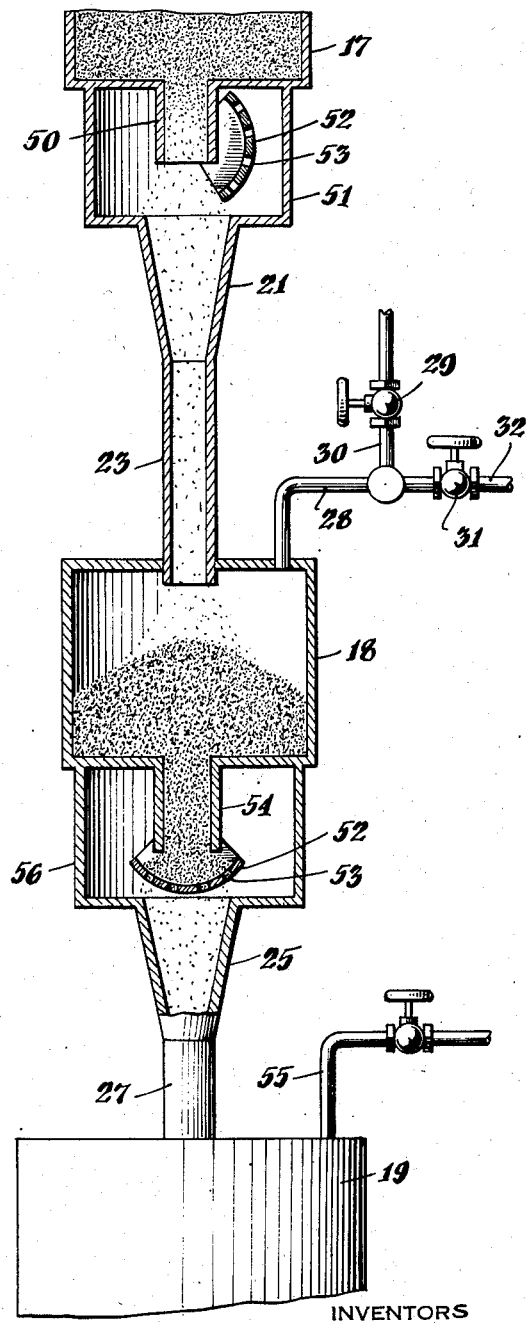

2,826,313

TRANSFER OF GRANULAR CONTACT MATERIAL

John W. Payne, Woodbury, and Kenneth E. Magin, Barrington, N. J., assignors to Socony Mobil Oil Company, Inc., a corporation of New York Original application January 28, 1954, Serial No. 406,648. Divided and this application June 4, 1957, Serial No. 663,473

8 Claims. (Cl. 214—17)

This invention pertains to the transfer of granular solid contact material and particularly relates to the transfer of granular material from a first chamber maintained at one pressure to a second chamber maintained at a substantially higher pressure. This case is a division of case Serial Number 406,648, filed January 28, 1954.

A variety of cyclic hydrocarbon conversion processes are known in which a granular solid contact material is gravitated in substantially compact columnar form through reaction and reconditioning zones and the zones are maintained at substantially different pressures. Such processes include cracking, reforming and coking, among others. They all involve the problem of feeding the granular material into the high pressure reactor in some satisfactory way. Where the pressure differential between the contacting vessels is not great, say, for example, about 5–10 p. s. i. (gauge), the gravity feed leg has been used successfully for this purpose. This involves an elongated column of contact material or catalyst of restricted cross-section extending upwardly above the reaction zone a sufficient length to permit the catalyst to feed smoothly against the pressure into the reaction zone. This feed leg is described and claimed in U. S. Patents 2,410,309 and 2,531,365. The calculated head or weight of catalyst in the seal leg column per unit of cross-sectional area is sufficient to permit the catalyst to feed into the reaction zone without restrictions in the passage. The calculated head is merely an arbitrary figure of weight per unit of cross-section of the column found necessary for smooth feeding of the catalyst and does not refer to "head" in the sense that term is used in speaking of fluids or fluidized catalyst columns. It is found that 4–5 feet of seal leg is required for each pound of pressure differential. It is seen, therefore, that when the difference in pressure between the contacting vessels is great, the seal leg must be excessively long and hence, the gravity feed leg is not recommended for reactor pressures in excess of about 15 p. s. i. (gauge).

Recently high pressure cracking and reforming has been proposed. In these processes the granular catalyst is passed through the reactor as a compact gravitating bed. The catalyst is of a suitable size range, such as 4–10 mesh Tyler. Other sizes are used, of course, depending upon the particular process involved. The particles may be very large, such as about ½ inch pebbles or may be substantially smaller, such as 30–60 mesh clay. In compact transfer systems, it is desirable that the particles be reasonably uniform in size, so that gas flow through the voids in the bed will be uniform. The material may be a natural or acid treated clay such as kaolin or bentonite, may be a co-precipitated synthetic gel, such as silica-alumina beads. The various types of contact material used in these hydrocarbon conversion processes, as well as the desired shapes and sizes are well known and will not be described in greater detail. The reactor is maintained at a suitable temperature, such as about 800–1000° F., depending upon the particular type of reactions occurring in the vessel. The hydrocarbons, suitably prepared for treatment, are introduced into the vessel to pass through the bed and converted products are removed therefrom. The pressure may be 30–75 p. s. i. or even as high as 100–200 p. s. i., depending upon the reactions involved. During conversion the particles are contaminated with a carbonaceous or coky deposit and generally they give up heat during the processs. The spent contact material is removed from the bottom of the vessel and passed through a kiln where the deposits are removed by burning. The burning is generally conducted at atmospheric pressure for safety and convenience. The regenerated and reheated contact material is then transferred to the top of the reaction vessel for reuse.

The regenerated catalyst is usually delivered to a storage zone or hopper above the reactor and transferred downwardly therefrom into a pressuring vessel intermediate the storage vessel and the reactor when the pressure in the pressuring vessel is low. Flow from the hopper to the pressuring vessel is interrupted intermittently and the pressure in the pressuring vessel is raised. The catalyst is then delivered from the pressuring vessel to the reaction vessel. Of course, some means must be provided in the catalyst conduits connecting the hopper with the pressuring vessel and pressuring vessel with the reactor for sealing the conduits against excessive gas flow when the pressure differential between the vessels is high. Plug valves above and below the pressuring vessel have been used for this purpose. Recently, a valveless feeding system has been proposed which uses a column of catalyst in the conduit as the gas sealing means. The column has a lower portion of restricted cross-section which is short enough so that the gas pressure drop per foot along that portion of the column is enough to disrupt the column. The upper portion of the column, however, has an expanded cross-section, usually located in the vessel above, in which the upward gas velocity is reduced below the bed disrupting velocity. The expanded portion is maintained deep enough so that the entire column is maintained in static condition, thereby serving as a seal between the two vessels. One of these or an alternate method is used to prevent excessive transfer between the vessels when catalyst is being transferred intermittently from one vessel downwardly to the next lower vessel.

The size of plug valve used in the conduit and the size of the conduit used must be at least large enough to transfer a sufficient amount of catalyst during the flowing portion of the cycle to meet the catalyst requirements of the reactor. Of course, if too large valves and conduits are used, the expense is too high. Furthermore, when the valveless pressure lock system of feeding catalyst is used, conduits of large cross-section pass more seal gas while serving as a seal between the zones of different pressure. It is desirable, therefore, that the valves and connecting conduits be as small as possible. The valves and conduits have a maximum catalyst flow which can be passed through them when the material is flowing in compacted form.

The object of this invention is to provide an apparatus for increasing the flow rate of granular solids through conduits and valves.

A further object of this invention is to provide an improved apparatus for feeding granular material from a low pressure zone downwardly to a substantially higher pressure zone.

A further object of this invention is to provide improved apparatus for feeding granular catalyst to a reactor in high pressure cracking and reforming processes.

These and other objects will be made more apparent in the detailed portion of the specification which follows.

One aspect of the invention involves feeding the granular material into a storage zone at low pressure to form a compact bed therein. A line depending from the zone is first drained of granular material by momentarily interrupting flow from the bottom of the zone and the granular material is then allowed to flow in free-fall through the line at a flow rate much higher than the maximum possible through that line in compacted form. The upper end of the conduit is slightly tapered inwardly from the top down to the level of minimum cross-section, whereby the maximum flow rate of the solids through the conduit is increased over that maximum flow rate obtainable without using a tapered section. By this expedient the same flow can be transferred through valves and conduits of smaller cross-section. The invention finds application when feeding catalyst to a high pressure reactor in reforming, cracking or other similar processes, when using plug valves as the gas sealing means, when using the valveless feeder system of sealing against gas flow through the lines or other similar systems of intermittently charging catalyst or granular material downwardly from a compact bed under low pressure onto a second compact bed of solids under a substantially higher pressure.

Figure 1 shows diagrammatically a complete moving bed system.

Figure 2 shows in vertical elevation, an apparatus arrangement for feeding granular material into a high pressure vessel.

Figure 3 shows an elevational view, partially in section, of an alternate apparatus arrangement for feeding granular contact material into a high pressure vessel.

Referring now to Figure 1, a complete cyclic system is shown with a high pressure reactor, low pressure kiln, and connecting conduits and apparatus for transferring the contact material from the bottom of one of the vessels to the top of the other in a completely enclosed cyclic path. The granular material is gravitated in substantially compact form downwardly through the kiln 10. A combustion supporting gas, such as air, is introduced into the vessel through the conduit 11 and passes through the voids in the bed to burn the carbonaceous material from the granular solids. Flue gas formed during combustion is removed from the vessel through the conduit 12. The pressure is generally maintained at about atmospheric and temperature at about 1000–1300° F., although other temperatures and pressures are sometimes used. The reactivated contact material is removed from the bottom of the kiln 10 through the conduit 13 at a flow rate controlled by the valve 14. The material is elevated through the elevator 15 and discharged through the conduit 16 into the top of a surge hopper 17. Of course, other means of elevating the catalyst may be used. Dilute phase pneumatic lifts have been used in which the catalyst is blown upwardly through an upwardly extending lift pipe in a stream of rapidly moving gas. Continuous bucket elevators have been used successfully for elevating the catalyst as well as conveyors of the Redler type.

The surge hopper 17, pressuring vessel 18 and connecting conduits and valves, shown on Figure 1, provide a pressure lock system for introducing the granular material into the high pressure reactor 19. The particles form a substantially compact mass in the surge hopper. Below the surge hopper is located a slide valve 20. This valve is used as a solids flow interrupting apparatus and is not used for interrupting gas flow. Slide valves of this type are useful for interrupting a gravitating column of contact material. They are not designed for a tight fit, but merely permit the plate to push through the column of contact material without crushing the material. Below the valve 20 is a tapered duct 21. This duct is tapered inwardly from top to bottom at a rather steep angle with the horizontal down to a minimum cross-section which is just equal to the cross-section of a plug valve 22. The plug valve 22 is designed to effect a gas tight seal so that a suitable pressure drop can be maintained across the valve. Below the valve 22 is a conduit 23 which connects with the top of the pressuring vessel 18. Below the pressuring vessel is a second slide valve 24 which is similarly designed as a solids flow interrupting apparatus rather than a pressure tight valve. Below the slide valve 24 is a second tapered duct 25 and gas tight plug valve 26. Below the plug valve is a conduit 27 which connects with the top of the high pressure reactor 19. The pressuring vessel may be vented to the atmosphere through the conduit 28 by opening the valve 29 in the vent line 30. With the plug valve 26 closed and the plug valve 22 opened, granular contact material will drain downwardly from the hopper 17 through the connecting conduits into the pressure vessel 18. The plug 22 is then closed and the valve 29 in the vent line 30 is also closed. Valve 31 in the pressure line 32 is opened permitting gas under high pressure to enter the pressuring vessel 18. When the pressure in the pressuring vessel is substantially that maintained in the reactor 19, the plug valve 26 is opened allowing the contact material to drain from the pressuring vessel into the reactor. The plug valves 22 and 26 may be controlled automatically by motors operated by a cycle timer not shown, to intermittently open and close, thereby feeding at regular intervals a supply of granular contact material to maintain a gravitating bed of the material in the reactor 19. The purpose of the slide valves 20 and 24 and the tapered ducts 21 and 25 will be explained in more detail hereinafter. Reactants properly prepared for conversion are introduced into the reactor through the conduit 33 and passed upwardly through the gravitating bed of contact material. The converted products are removed from the upper portion of the reactor through the conduit 34. Suitable sealing means, not shown, may be used to introduce inert gas at various critical points in the system to restrict the flow of hydrocarbons to the desired path. The reactor may be maintained at a pressure of say 100 pounds per square inch and at a temperature of about 800–1000° F., for reforming a hydrocarbon naphtha to provide a gasoline of improved characteristics. During the reforming or cracking reactions, the contact material receives a deposit of carbonaceous material which impairs its catalytic activity. The spent contact material is removed from the bottom of the reactor through the conduit 35. The valve 36 in the conduit may be used to control the flow rate of the catalyst through the reactor. The catalyst is passed through a depressuring pot 37 wherein the pressure is reduced to substantially atmospheric. The spent contact material is elevated through the elevator 38 and discharged through the conduit 39 into the top of the kiln 10, thereby completing the enclosed cyclic path.

Referring now to Figure 2, there is shown alternate apparatus for feeding granular contact material from a low pressure zone downwardly to a high pressure zone. Similar parts have been given similar numbers. The contact material is gravitated through the conduit 16 into the supply hopper 17 to form a compact mass of material in the hopper. At the bottom of the hopper 17 there is shown a pressure line 40 and a three-way valve 41 adapted to connect the pressure line 40 to the conduit 42 and communicate high pressure gas to the base of the supply hopper 17. Alternately, the three-way valve 41 may be shifted to connect the conduit 42 to a line 43 which communicates with a low pressure region. The tapered duct 21 in this embodiment is connected directly to the conduit 23 which communicates with the pressuring hopper 18. When the conduit 28 is connected with the conduit 30, the pressure in the pressuring hopper 18 drops to that of the supply hopper 17 and granular material feeds downwardly through the tapered duct 21 and connecting conduit 23 into the pressuring hopper. As long as the conduits 23 and 21 are filled with contact material the granular material will gravitate through the system as a substantially compact column at a fixed maximum flow rate. This flow rate is determined mainly by the cross-section of the conduit 23. We have found that the flow rate of the catalyst contact material through these connecting conduits can be increased substantially if the contact material is allowed to flow through them as free falling particles, each particle being separated from its adjacent particles as compared to flow in substantially compact columnar form in which the particles touch the adjacent particles. However, in order to get the contact material to flow through these conduits in free-fall, it is necessary to interrupt the flow of contact material from the supply hopper 17 long enough to allow the conduits 21 and 23 to drain of catalyst. High pressure gas is, therefore, introduced through the conduits 40 and 42 into the base of the supply hopper 17. Some of this gas flows downwardly with the descending catalyst to hasten its transfer through the conduits 21 and 23. A second portion of this gas passes upwardly through the supply hopper and the pressure of the gas is controlled so that the catalyst in the supply hopper will be held up by the gas. This permits the conduits 21 and 23 to drain rapidly. The conduit 42 is then connected with the vent conduit 43, thereby depressuring the base of the supply hopper. The solid material then falls freely through the conduit 21 and 23 at a very high flow rate which may be as much as 4 to 5 times the maximum flow rate of the material through these conduits when the material is flowing in compact columnar form. It is only necessary that the flow of catalyst through the system be interrupted by the gas for a very brief moment to convert the flow from compact transfer to that of a free flowing stream. When the pressuring hopper is filled with catalyst, the conduits 21 and 23 will be again filled with a compact column of contact material which extends into the supply hopper 17. The valve 44 is then shifted to connect the conduit 28 with the pressure line 32 allowing high pressure gas to enter the pressuring hopper and the pressure in the hopper is built up to substantially that of the reactor 19. When the reactor is operated under substantial pressure, such as in high pressure cracking or reforming, the pressure drop across the conduits 21 and 23 will be sufficient to disrupt the column of catalyst in these conduits. For example, the pressure drop per foot will be in excess of about ½ p. s. i. per foot and may be as high as 3 to 5 pounds per square inch per foot. This is more than sufficient to disrupt a column of contact material and is high enough to blow the particles upwardly through the conduits. However, in this invention the supply hopper 17 has a substantially larger cross-section than the conduits 21 and 23 and the level of the column of contact material is maintained high enough in the hopper 17 so that the gas velocity in the hopper is reduced substantially below the bed disrupting velocity before the gas reaches the surface of the catalyst column. It has been found that if this bed is maintained large enough in cross-section relative to the lower portion of the catalyst column and deep enough that the entire catalyst column can be maintained in static condition and serve as a seal against a substantial pressure differential. It is found that the smaller the cross-section of this conduit the less seal gas need be used in the pressuring hopper. It is, therefore, highly desirable to maintain this conduit as small in cross-section as possible in order that a minimum amount of gas need be pumped through the conduit 32 and 28 into the pressuring hopper 18. It is seen, therefore, that by permitting the contact material to flow through the conduits 21 and 23 in free-fall rather than as a compact gravitating column, the same flow rate of contact material may be maintained with a conduit 23 of substantially smaller cross-section. While the pressure in the pressuring hopper 18 is substantially that of the reactor 19, the valve 45 is normally placed in a position which permits high pressure gas to pass through the conduits 46 and 47 to the base of the pressuring hopper 18. This gas pressure is maintained high enough so that it would hold up the catalyst in the pressuring hopper and help to drain the conduits 25 and 27 of catalyst. The valve 45 is then shifted to connect the conduit 47 with the vent line 48, thereby permitting catalyst to fall from the pressuring hopper to the conduits 25 and 27 in free-fall at a very high flow rate. This permits the catalyst to transfer from the pressuring hopper into the surge section of the reactor and the vessel is made large enough so that when the reactor 19 is filled there will still be a sufficient supply of catalyst to fill the conduits 27 and 25 and still maintain a bed of the material in the pressuring hopper 18 of sufficient depth to serve as a seal against the escape of gas from the reactor 19 when the pressure in the pressuring hopper 18 is once again reduced to substantially that of the supply hopper 17.

Referring once again to Figure 1, the pressure lock system will now be disclosed in more detail. When the pressure in the pressuring vessel 18 is substantially that of the surge hopper 17, the slide valve 20 is passed through the compact column of catalyst at the base of the surge hopper so as to provide a floor which will hold up the catalyst in the surge hopper momentarily. The gate valve 22 is opened and catalyst drains from the tapered duct beneath the slide valve 20 to empty the conduits 21 and 23. The slide valve 20 is then opened, allowing catalyst to fall in free-fall through the conduits 21 and 23. This permits a substantially greater flow rate of catalyst through the gate valve 22 than would be possible if the solid material were flowing in substantially compact columnar form. Without providing some apparatus such as the slide valve 20, the tapered duct 21 would be filled with a compact column of catalyst and when the gate valve 22 was opened, this column would gravitate through the valve in substantially compact form. Therefore, without the solids flow interrupting apparatus 20, the gate valve 22 would have to be substantially larger in order to transfer the same amount of catalyst in the same period of time. These gate valves are close fitting, carefully machined pieces of apparatus designed to provide tight fits which permit a very high pressure to be taken across the valve. They are exceedingly expensive and become much more expensive when larger valves are used. It is, therefore, important to keep these valves as small as is possible and this invention permits the use of smaller valves than would otherwise be possible. The flow interrupting means 20 is closed after a sufficient amount of catalyst has been transferred into the pressuring vessel 18. The flow of catalyst from the surge hopper 17 is interrupted before the conduit 23 is filled with catalyst up to the level of the gate valve 22. This, therefore, permits the gate valve 22 to be closed on an empty column. It is undesirable to close gate valves on compact columns of catalyst because the catalyst is crushed and the fine particles find their way into the recesses of the valve, causing rapid wear of the valve and making it difficult for the valve to cross properly. When the pressure in the pressuring vessel 18 is raised to substantially that of the reactor 19, the gate valve 26 is opened and the slide valve 24 is closed momentarily interrupting the column of catalyst below the pressuring vessel. When the conduits 25 and 27 have drained catalyst, the flow interrupting slide valve 24 is opened, allowing the catalyst to rain downwardly through the conduits 25 and 27 in free-fall, thereby transferring the catalyst at a rapid flow rate from the pressuring vessel into the high pressure reactor 19. Of course, all the valves in this feeding system may be controlled automatically by means of a cycle timer and electric or mechanical motors, this apparatus not being shown.

Referring now to Figure 3, there is shown an alternate embodiment of this invention. This figure shows the bottom of the supply hopper 17 with a short discharge outlet 50 located in the bottom thereof and enclosure 51 surrounding the bottom of the outlet. The enclosure is connected to the top of the tapered duct 21. Below the outlet is a swing valve 52. The swing valve serves as a flow interrupting means in this embodiment. The valve 52 when swung into the closed position is located some distance below the outlet 50, so that the valve 52 merely cuts through the stream of falling catalyst below the outlet 50. The valve 52 is opened to permit the catalyst to rain downwardly through the outlet 50 and conduits 21 and 23 in free-fall at a very high flow rate. When the pressuring hopper 18 is filled with catalyst and the catalyst column is commencing to rise upwardly through the conduits 23 and 21, the swing valve 52 is closed substantially reducing the flow rate of the catalyst from the hopper 17. The swing valve 52 has a series of orifices 53 which permit catalyst to flow through the valve, but at a substantially reduced flow rate. This permits enough catalyst to flow into the conduit 21 to fill the conduit and provide a continuous column of catalyst from the pressuring vessel 18 into the hopper 17, and yet by closing the valve 52 just prior to the end of the feeding cycle, the valve 52 is not closed on a compact column but rather on catalyst falling in a free-falling stream. This makes it easy to close the valve 52 and yet by providing the orifices in the valve 52, the catalyst column is extended from the pressuring vessel up into the surge hopper 17 to thereby serve as a seal when the pressure in the pressuring hopper is raised. When the pressuring hopper 18 is placed under pressure, catalyst will drain from the conduits 25 and 27 and the swing valve 53 beneath the pressuring hopper 18, is opened to permit catalyst to rain in free-fall downwardly from the outlet 54 through the conduits 25 and 27. The pressure drop per foot in the conduits 23 and 21 will then be sufficient to disrupt the column of catalyst in these conduits and to drive the catalyst upwardly through the conduits. But, because the column continues up through the outlet 50 into the enlarged hopper 17, the gas flow in the hopper 17 is reduced to a velocity below the bed disrupting velocity at a level a sufficient distance below the surface of the bed in the hopper 17 so that the entire column is maintained in compact form and serves as a suitable seal to prevent the escape of an excessive amount of gas from the pressuring hopper 18. This invention, of course, permits the cross-section of the conduits 23 and 27 to be reduced substantially below that cross-section which would be required to pass a compact gravitating column of contact material at the desired circulation rate. The amount of seal gas, therefore, required by this invention is substantially smaller than would be required if some flow interrupting means were not provided at the base of the storage vessels. The swing valve 53 is closed just prior to the time when the conduit 25 is filled with a compact column of catalyst, so that this valve also closes on a stream of catalyst falling freely rather than a compact column. An inert gas may be introduced into the top of reactor 19 through the conduit 55 at a pressure just slightly higher than that in the reactor, such as, for example, about ½ pound per square inch higher than the pressure in the reactor. The inert gas introduced into the top of the reactor 19, passes upwardly through the conduits 27 and 25 to serve as a seal and prevent the escape of reactants from the reactor 19. When the pressure in the pressuring vessel 18 is low, the pressure drop of the gas passing upwardly through the conduits 27 and 25 will normally be high enough to disrupt the column of catalyst in these conduits and blow it upwardly into the chamber 56. This is prevented, however, by maintaining a continuous column of catalyst upwardly through the conduits 27, 25, chamber 56 and extending upwardly into the pressuring vessel 18 a sufficient length so that the gas velocity is reduced at some level below the surface of the catalyst column to a velocity below the bed disrupting velocity. The cross-section of the catalyst column in the pressuring vessel 18 above this critical level is made large enough, and the depth of catalyst above the critical level is maintained deep enough to maintain the entire column in static condition to serve as a seal between the pressuring vessel and the reactor 19.

It has been found that if a tapered section, such as the tapered ducts 21 and 25, is provided, having the right amount of taper, that the catalyst will fall in free-fall through the conduit 23 and the conduit 27 at a maximum flow rate which is higher than that flow rate which would be obtained without the use of tapered inlets. The tapered section should be tapered broadly at an angle with the horizontal of about 80 to 89.5 degrees and preferably at an angle with the horizontal of about 84 to 88 degrees.

The free-fall flow capacity of a conduit below the tapered section depends upon the inlet cross-sectional area and length of the tapered duct. The maximum velocity of granular solids in free-fall through a conduit below the tapered section is given by the equation, $$V = 0.286 \frac{\mu_f}{D_p \rho_f} \left[ \frac{D_p^3 \rho_f (\rho_p - \rho_f)}{\mu_f^2} \right]^{0.688}$$

where $V$ = maximum velocity of granular solids in free-fall ft./sec.
$D_p$ = particle diameter of solids, ft.
$\rho_p$ = particle density of solids, lb./ft.$^3$
$\mu_f$ = viscosity of fluid medium, lb./(ft.) (Sec.)
$\rho_f$ = density of fluid medium, lb./cu. ft.

For a tapered inlet duct to be effective the ratio $$\frac{0.286 \mu_f}{D_p \rho_f} \left[ \frac{D_p^3 \rho_f (\rho_p - \rho_f)}{\mu_f^2} \right]^{0.688} \Big/ 8.94 (4R_1)^{0.5} (1 - 2.5\mu) \log \frac{3.2 R_1}{D_p}$$

must be greater than 1 and preferably greater than 1.5 where:

$R_1$ = hydraulic radius of conduit, ft.
$\mu$ = coefficient of internal friction of solids, dimensionless The maximum flow rate through the conduit is $$Q = 60 V A_1$$

where $Q$ = max. flow rate, cu. ft./min.
$A_1$ = cross-sectional area of conduit, sq. ft.

The inlet cross-sectional area of the tapered duct is expressed by the equation, $$Q = 535 A_2 (4R_2)^{0.5} (1 - 2.5\mu) \log \frac{3.2 R_2}{D_p}$$

where $A_2$ = cross-sectional area of inlet of tapered duct, sq. ft.
$R_2$ = hydraulic radius of inlet of tapered duct, ft.

The hydraulic radius is the cross-sectional area divided by the wetted perimeter of the duct or pipe.

The length of the tapered duct may be expressed by the equation, $$L = 1.72 \times 10^{-2} V^2 [ln(1.11 V^2 - V_o^2) - ln(0.11 V^2)]$$

where $L$ = length of tapered duct, ft.
$V_o$ = velocity through inlet of tapered duct, ft./sec.

*Example I*

A tapered inlet for a 6-inch pipe to carry bead cracking catalyst at 1000° F. in air at atmospheric pressure is designed below.

Catalyst particle diam., $D_p$ _____ inches __ 0.13
Catalyst particle density _____ lb./cu. ft __ 79

Density of air _____ lb./cu.ft __ 0.0272
Viscosity of air _____ cp __ 0.037
Diameter of pipe, $D_1$ _____ inches __ 6.065
Diameter of top of tapered duct, $D_2$ ____ do ____ 8.5
Length of tapered duct, L _____ feet __ 2.40
Angle of taper _____ degrees __ 87.5
Catalyst flow capacity of pipe without tapered
  inlet _____ T./hr __ 50
Catalyst flow capacity of pipe with tapered
  inlet _____ T./hr __ 130

*Example II*

Tests were made using a silica-alumina cracking catalyst flowing in free-fall through a tapered rectangular venturi leg of different lengths and cross-sectional areas. The tapered duct was mounted vertically with the cross-section gradually decreasing from the top down to a minimum at the bottom. The side walls of the duct made an angle of about 87° with the horizontal. The following results were obtained:

| Minimum Dimensions, Inches | Minimum Cross-Sectional Area, Sq. In. | Length of Duct, In. | Velocity of Catalyst, Ft./Sec. | Capacity, Cu. Ft./Min. | |
|---|---|---|---|---|---|
| | | | | With Tapered Duct | Without Tapered Duct |
| 5 x 2 | 10.00 | 12 | 5.78 | 24.2 | 7.4 |
| 5 x 1 ial 23/32 | 8.59 | 21 | 7.10 | 25.4 | 5.8 |
| 5 x 1⅜ | 6.88 | 40½ | 7.43 | 22.2 | 4.0 |
| 5 x 1⅜ | 6.88 | 60 | 8.73 | 25.0 | 4.0 |

*Example III*

Tests were conducted to determine the difference in flow characteristics of a silica-alumina cracking catalyst in free-fall through a conical as compared to a rectangular venturi duct. The duct was tapered from top to bottom at an angle with the horizontal of about 87°. The following results were obtained:

| Type of Cross-Section | Minimum Dimensions, Inches | Minimum Area, Inches² | Length of Duct, Inches | Capacity | |
|---|---|---|---|---|---|
| | | | | Without Tapered Duct, C.F.M. | With Tapered Duct, C.F.M. |
| Rectangular | 5 x 1 23/32 | 8.59 | 21 | 5.8 | 24 |
| Circular | 3 | 7.09 | 21 | 5.8 | 24 |

It is seen from the foregoing that the maximum flow rate of the catalyst through the tapered duct is increased 4 to 5 times by changing the flow from compact transfer to free-falling condition.

The examples given hereinabove are merely illustrative of the invention and are not intended to limit the scope thereof.

We claim:

1. Means for transferring a granular contact material downwardly from a first vessel at one pressure to a second vessel located therebelow and maintained at a substantially higher pressure which comprises in combination: a first vessel, an inlet in the top thereof and outlet in the bottom, solids flow interrupting apparatus located adjacent said outlet, control means attached to the flow interrupting apparatus, a pressuring vessel located intermediate the first and second vessel, means for increasing and decreasing the pressure of said pressuring vessel, an inlet in the top thereof and outlet in the bottom, a first passageway connected between the outlet of the first vessel and inlet of the pressuring vessel, having a substantially reduced cross-section at at least one level, a first gas sealing apparatus, for substantially preventing the upward flow of gas from said pressuring vessel to said first vessel, solids flow interrupting apparatus located adjacent the outlet of said pressuring vessel, an inlet in the top of said second vessel and outlet in the bottom thereof, a second passageway connected between the outlet of said pressuring vessel and inlet of the second vessel, having a substantially reduced cross-section at at least one level, and a second gas sealing apparatus, for substantially preventing the upward flow of gas from said second vessel to said pressuring vessel, the upper end of said first and second passageway being tapered uniformly from the top down to a level of minimum cross-section so as to effect a velocity increase of solid particles falling through the passageways.

2. The apparatus of claim 1 further characterized in that the gas sealing apparatus is a gate valve located in the passageway below the solids flow interrupting apparatus.

3. The apparatus of claim 1 further characterized in that the upper end of the first and second passageway is tapered uniformly from the top down to a level of minimum cross-section at an angle with the horizontal of about 80–89.5°.

4. The apparatus of claim 1 further characterized in that the upper end of the first and second passageway is tapered uniformly from the top down to a level of minimum cross-section at an angle of about 84–88° with the horizontal.

5. The apparatus of claim 1 further characterized in that the solids flow interrupting apparatus comprises means for introducing a fluid under pressure sufficient to stop the downward flow of solids at a level near the upper end of each passageway.

6. The apparatus of claim 1 further characterized in that the flow interrupting apparatus comprises a slide valve adapted to slide into a position above the passageway and hold up a substantially compact column of granular material.

7. The apparatus of claim 1 further characterized in that the flow interrupting apparatus comprises a slide valve in which the valve plate is arranged to move into a position above the passageway and hold up a substantially compact column of granular material, the plate of said valve possessing apertures, for the transfer of granular material therethrough into the passageway therebelow, the apertures being sized to restrict the flow rate of the granular material through the passageway when the valve is closed below the maximum flow rate of the passageway when the solid material is in compact flowing condition.

8. The apparatus of claim 1 further characterized in that the gas sealing apparatus comprises a compact column of the granular material, the lower end of the column being within the passageway between the vessels and the upper end of the column being extended into at least the lower portion of the vessel above the passageway, the cross-section of the vessel being at least sufficiently larger than that of the passageway therebelow so that the upper end of the column of granular material is large enough in cross-section and the expanded portion of the column is deep enough to maintain the column of granular material substantially in compact form from bottom to top and motionless, even though the pressure differential across the lower and more restricted portion of the column is more than sufficient to push the column of granular material upwardly through the passageway.

No references cited.